(12) United States Patent  
Rossi

(10) Patent No.: US 6,655,264 B2
(45) Date of Patent: Dec. 2, 2003

(54) MULTIFUNCTION STEAM COOKER WITH IMPROVED UNATTENDED OPERATION CAPABILITY

(75) Inventor: Fabrice Rossi, Fontaine Francaise (FR)

(73) Assignee: Seb S.A., Ecully (FR)

( * ) Notice: Subject to any disclaimer, the term of this patent is extended or adjusted under 35 U.S.C. 154(b) by 0 days.

(21) Appl. No.: 10/287,652

(22) Filed: Nov. 5, 2002

(65) Prior Publication Data

US 2003/0084790 A1 May 8, 2003

(30) Foreign Application Priority Data

Nov. 6, 2001 (FR) .............................. 01 14345

(51) Int. Cl.[7] .............................. A23L 1/00; A47J 27/00; A47J 27/04; A47J 37/00
(52) U.S. Cl. .............................. 99/413; 99/330; 99/331; 99/339; 99/417; 99/446; 99/448
(58) Field of Search .............................. 99/330, 331–333, 99/339, 340, 345–347, 403, 410–418, 444–450, 473–476, 467, 483, 516, 536; 219/400, 401, 415, 442, 441; 426/418, 509–511, 523; 126/369, 369.1, 369.2, 20, 21 A

(56) References Cited

U.S. PATENT DOCUMENTS

| 4,485,801 A | | 12/1984 | Hodges et al. | |
| 4,509,412 A | | 4/1985 | Whittenburg et al. | |
| 5,275,094 A | * | 1/1994 | Naft | 99/416 |
| 6,125,738 A | * | 10/2000 | Poister | 99/339 |
| 6,230,612 B1 | * | 5/2001 | Rossi | 99/446 |
| 6,267,046 B1 | * | 7/2001 | Wanat | 99/332 |
| 6,474,222 B1 | * | 11/2002 | Pretre | 99/331 |

FOREIGN PATENT DOCUMENTS

| DE | 271 877 | 3/1914 |
| DE | 33 04 058 | 8/1984 |
| FR | 2 786 083 | 5/2000 |
| WO | WO 88/07829 | 10/1988 |

* cited by examiner

Primary Examiner—Timothy F. Simone
(74) Attorney, Agent, or Firm—Browdy and Neimark

(57) ABSTRACT

A steam cooker composed of: a water reservoir for water that is to be converted into steam by a steam generator; a cooking enclosure for receiving a cooking vessel and/or a support provided with flow passages, the cooking enclosure being arranged to be supplied with steam from the steam generator; an intermediate collecting receptacle associated with the cooking enclosure and disposed for collecting liquid that appears in the cooking enclosure during a cooking operation, the intermediate collecting receptacle having a pouring orifice via which liquid can flow from the intermediate collecting receptacle into the water reservoir; and a removable closing member associated with the pouring orifice for selectively blocking flow of liquid via the pouring orifice.

15 Claims, 2 Drawing Sheets

MULTIFUNCTION STEAM COOKER WITH IMPROVED UNATTENDED OPERATION CAPABILITY

BACKGROUND OF THE INVENTION

The present invention relates to the field of steam cooking appliances or implements, and concerns more particularly multifunction steam cookers provided for cooking on a perforated support as well as in a vessel.

A steam cooking appliance or implement has a base provided for the production of steam that is to be supplied to a cooking enclosure. Steam cooking appliances also have heating means, for example of the electric type, while cooking implements do not have a separate heating means.

Appliances and implements are provided with a cooking enclosure that generally includes a lower receptacle atop which one or several cooking vessels, or supports, and a lid, are provided. The lower receptacle is used to collect cooking liquids and condensates. However, the cooking enclosure can have an external wall that is independent of the vessels and/or the cooking supports, and/or the collecting receptacle.

Slow cooking or simmering is effectuated at a temperature below 100° C., but can last for several hours. Steam can thus be utilized to perform this cooking. A cooking vessel adapted to such slow cooking has a lateral wall and a bottom that are not provided with openings. A lid closing the cooking vessel enables the food products to be protected from the vapor. Heat is transmitted to the food products via the walls.

Steam cooking of dry food products, such as rice, is carried out in water and utilizes a cooking vessel having a bottom that is not provided with openings and a lateral wall whose lower part is also not provided with openings. It is preferable to not use a lid to close the cooking vessel. In effect, the absence of a lid permits the steam to be in contact with the food products or the liquid in order to accelerate the cooking. Liquid foods such as sauces and soups can equally be cooked or reheated in this manner.

Steam cooking of other food products is generally performed on perforated supports through which steam passes.

U.S. Pat. No. 4,509,412 discloses a steam cooker having a cooking vessel provided with a curved bottom having openings at the periphery of the bottom. The openings are arranged above a receptacle for recovering cooking liquids. This arrangement avoids disturbing water in the reservoir arranged at a central position in the base of the appliance.

The patent document WO 88/07829 discloses a steam cooker having a cooking enclosure with a lid that is provided with an internal peripheral groove communicating with a pouring tube opening above the water reservoir. This arrangement permits condensates to be collected.

It has been noted that none of these appliances allows the recycling of condensates to be reconciled with the separate collection of cooking juices in a simple manner.

BRIEF SUMMARY OF THE INVENTION

The present invention provides a steam cooker that does permit the recycling of condensates to be reconciled with the separate collection of cooking juices in a simple way. Thus, the invention provides a steam cooker of the type described above, in which the utilization of cooking juices is facilitated.

To achieve these and other objects, the invention provides a steam cooker having a water reservoir supplying or constituting a steam production chamber, and a cooking enclosure supplied with steam from the steam production chamber, having an intermediate collecting receptacle provided with a means for pouring liquid into the water reservoir, in which can be arranged a cooking vessel and/or support provided with a means permitting liquid to flow into the intermediate collecting receptacle. According to the invention, pouring means is associated with a removable blocking, or closing, means.

References herein to a cooking vessel are intended to encompass a vessel having an imperforate bottom and sidewalls that are imperforate to a sufficient height to avoid overflow or escape of the food products. Steam can reach the food products if no lid is provide on the vessel. However, cooking juices will remain within the vessel. The vessel can be closed by a lid for a slow cooking of the simmering type, at a temperature below 100° C.

A support having a flow means refers to a support having lower and/or side openings, and/or lateral cutouts provided for flow of cooking liquids. Steam can thus pass through the support, through the openings or cutouts, and pass around the food products.

The removable closing means permits the user to employ the intermediate collecting receptacle either to allow condensates to flow into the water reservoir, or as a recovery basin, or bowl, for the cooking juices.

When the food products are placed in a cooking vessel, the cooking juices remain confined in the cooking vessel. Steam coming into contact with the interior walls of the cooking enclosure or with the outer walls of the cooking vessel form condensates that can flow along those walls to be collected in the intermediate collecting receptacle. The condensates not coming back into contact with the food products contained in the cooking vessel, then, constitute a water reserve that can be reused for cooking without risk of polluting the steam production chamber. In order to recycle the condensates toward the water reservoir, the user opens the pouring means of the intermediate receptacle by withdrawing, or removing, the closing means. This arrangement eliminates the need for the user to add water during a cooking operation, or at least reduces the frequency at which water must be added.

When the food products are placed on the cooking support, the user puts the closing means in place to block the pouring means of the intermediate collecting receptacle. This arrangement prevents the cooking juices coming from the food products placed in the cooking support from disturbing, or mixing with, the water in the reservoir. The user can then easily gain access to the cooking juices collected in the intermediate collecting receptacle.

An appliance or implement according to the invention is thus versatile and efficient.

Advantageously, the closing means is fixed to the intermediate collecting receptacle. This arrangement helps to prevent the closing means from being lost. Alternatively, the closing means can be independent or even fixed to another element of the steam cooker.

According to one embodiment, the closing means is composed of a valve having a closing surface connected to a shank engaged in the pouring means, the shank being pivotably supported by a lever along an off-center pivot axis. The lever has a bearing surface whose distance from the pivot axis increases between a first zone, in which the closing surface is moved to a position that opens the pouring means, and a second zone, in which the bearing surface is in contact with a surface of the intermediate collecting receptacle in order to maintain the closing surface against an opposed face of the receptacle. Thus, the position of the lever permits a control of the closing or opening of the pouring means by the valve.

Advantageously, then, the pouring means is an orifice arranged in a wall of the intermediate collecting receptacle, the closing surface being a ring and the shank extending from the interior of the ring. The orifice can then be provided in the bottom of the intermediate collecting receptacle.

Advantageously, also, the pivot axis between the shank and the lever is form by two aligned tenons, or pins, engaged axially in two cavities each having a lateral cutout permitting a force-fitted insertion of the tenons. This arrangement facilitates assembly of the device.

Advantageously then, the lever has a pair of cheeks, or side pieces, each carrying one of the tenons on its interior face, the bearing surface being arranged on the periphery of the side pieces. Such a part can easily be produced by molding. Also advantageously, the side pieces are connected by a tongue. Such a lever can be easily maneuvered by the user.

Also advantageously, the lever is arranged on an interior surface of the intermediate collecting receptacle. In other words, when the intermediate collecting receptacle is in place on the water reservoir, the user can gain access to the lever without having to withdraw the receptacle.

Also advantageously, the closing surface is formed by a joint, or seal, mounted on a flange fixed to the shank. Alternatively, the joint can be mounted on the intermediate collecting receptacle.

According to another embodiment, the closing means is formed by a supple plug, or stopper.

DETAILED DESCRIPTION OF THE INVENTION

Figure 1:
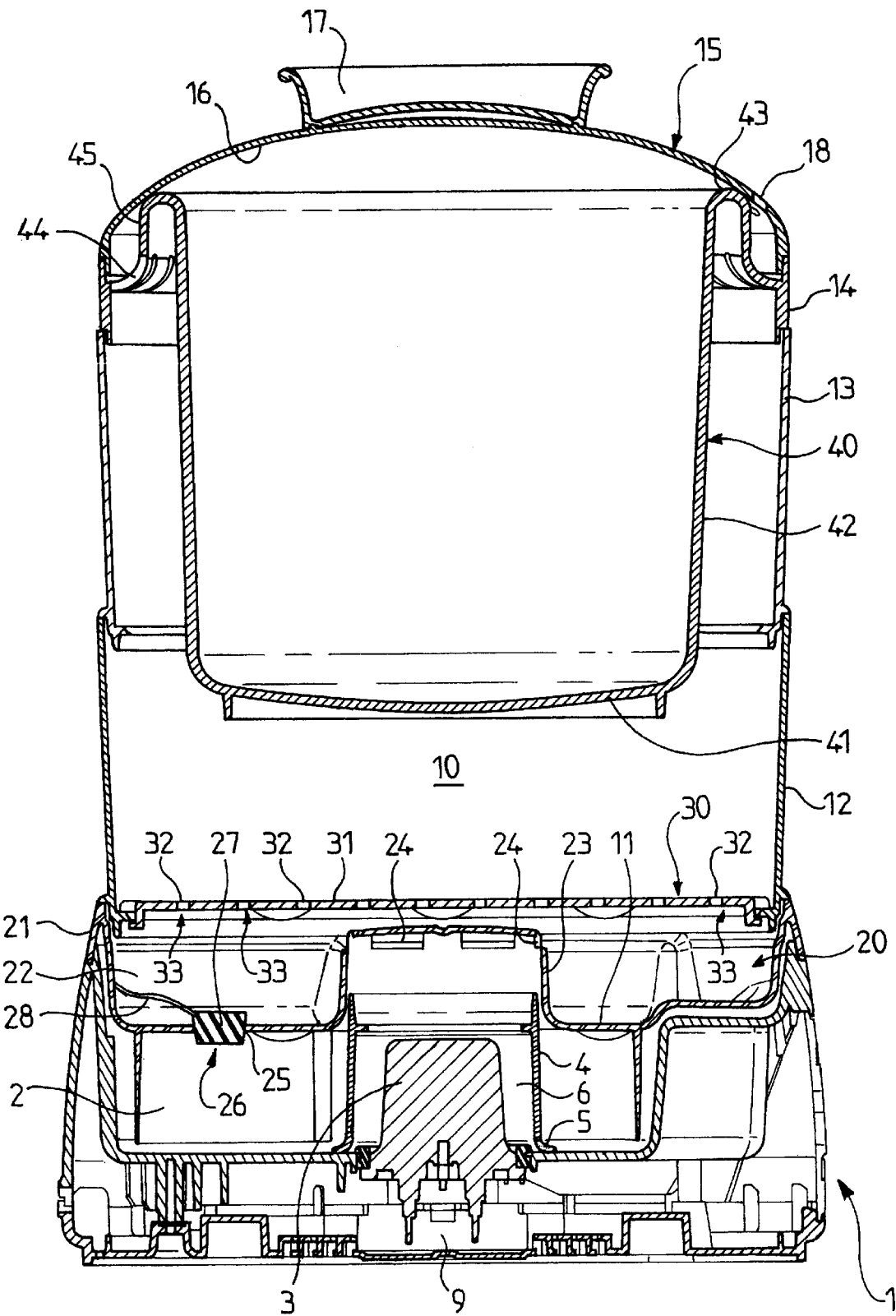
FIG. 1 is an elevational, cross-sectional view of an electric steam cooker according to the invention having a first example, or embodiment, of the means for closing the pouring means of the intermediate collecting receptacle.
Figure 2:
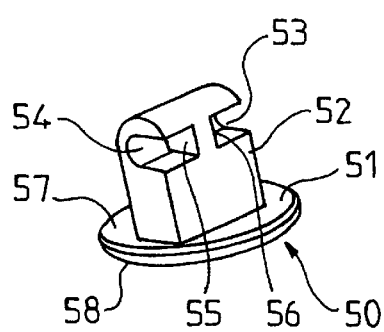
FIGS. 2 and 3 are perspective views of the two components of a second example of construction of the means for closing the pouring means of the intermediate collecting receptacle.

FIG. 1 shows an electric steam cooking appliance according to the first embodiment having a base 1, provided for the production of steam, the base being provided with a water reservoir 2 and a heating element 3 associated with an electronic control device 9 permitting operation of the appliance at full power during an initial phase of heating and operation at reduced power during the cooking phase. The reduced power can be furnished in the form of a continuous current or current pulses separated by intervals during which the electric power supply is disconnected. An annular wall 4 is arranged around heating element 3. Wall 4 is provided with a lower passage 5 separating reservoir 2 from a steam production chamber 6.

On top of base 1 there is provided a cooking enclosure 10 having a bottom 11, lateral walls 12, 13 and 14, and a lid 15. Lid 15 has a concave lower face 16, a gripping element 17 and a vent 18.

An intermediate collecting receptacle 20 arranged on base 1 forms the bottom 11 of cooking enclosure 10. Receptacle 20 has a peripheral wall 21 supporting lateral wall 12. Wall 21 surrounds a basin, or bowl, 22 provided to collect cooking juices or condensates. An annular wall 23 extends upwardly form the bottom of basin 22. Wall 23 has orifices 24 near its top provided for the passage of steam coming from chamber 6. Receptacle 20 has a pouring means 25 associated with a removable closing means 26. Pouring means 25 is formed by an orifice formed in the bottom of basin 22.

According to the form of construction shown in FIG. 1, closing means 26 is formed by a supple, or flexible, plug, or stopper, 27 connected to receptacle 20 by an attachment piece 28. Plug 27 is made, for example, of an elastomer.

A cooking support 30 is mounted on an internal rim, or flange, of wall 12. Cooking support 30 is formed by a removable plate 31 provided with perforations 32, the perforations forming a means 33 that permit liquid to flow into receptacle 20 disposed under plate 31.

A cooking vessel 40 has an imperforate bottom 41 and a lateral wall 42 that is imperforate up to the top of an upper rim 43. Openings 44 are provided in a wall 45 that forms a part of vessel 40 and connects vessel 40 to lateral wall 14 of enclosure 10. Openings 44 permit steam to reach the interior surface 16 of lid 15, where the steam condenses. Because of the concave form of lower surface 16, the condensates flow along that surface in order to form a liquid seal by condensation at the level of rim 43, due to the small distance provided between rim 43 and surface 16. Steam coming from stream production chamber 6 then continues to heat bottom 41 and lateral wall 42 of cooking vessel 40, without penetrating to the interior of the vessel.

When the user wishes to cook food products on support 30, cooking juices can flow through perforations 32 in plate 31. The user must insert plug 27 into pouring means 25 to block pouring means 25 if the user wants the cooking juices to be collected in receptacle 20. The user can easily gain access to the cooking juices collected in receptacle 20 by withdrawing the other elements of cooking enclosure 10.

When the user wants to cook food products in vessel 40, condensates can form on the wall of the cooking enclosure outside of vessel 40 and flow back into collecting receptacle 20. In order to prolong unattended operation of the appliance, the user can withdraw plug 27. The condensates collected in receptacle 20 can then flow back into reservoir 2 and can again supply water to steam production chamber 6.

Recycling of the condensates can equally be envisioned during cooking in a vessel placed on support 30. In effect, cooking juices remain confined in that vessel.

A second embodiment is illustrated in FIGS. 2–7, in which closing means 26' is formed by a valve 50 pivotably connected to a lever 60 along an off-center pivot axis 61.

Valve 50 has a closing surface 51 connected to a shank 52 pivoted with respect to lever 60. Closing surface 51 is an annulus and shank 52 emerges from the portion of valve 50 that is enclosed by this annulus. Closing surface 51 is formed by a joint, or seal, 57 mounted on a flange 58 fixed to shank 52. Shank 52 is engaged in an orifice forming pouring means 25 arranged in the bottom of receptacle 20. Two cavities 53 and 54 forming part of the pivot mechanism are formed in shank 52.

Lever 60 is composed of a pair of cheeks, or side pieces, 67, 68 connected together by a tongue 69. The inner face of each of cheeks 67, 68 carries a respective tenon, or pin, 65, 66. The two pins 65, 66, are aligned with one another. The axes of pins 65, 66 form the pivot axis 61. Lever 60 is arranged on an inner face 29 of receptacle 20. Lever 60 has bearing surfaces 62. The distance between each bearing surface 62 and axis 61 increases between a first bearing zone 63 and a second bearing zone 64.

Figure 3:
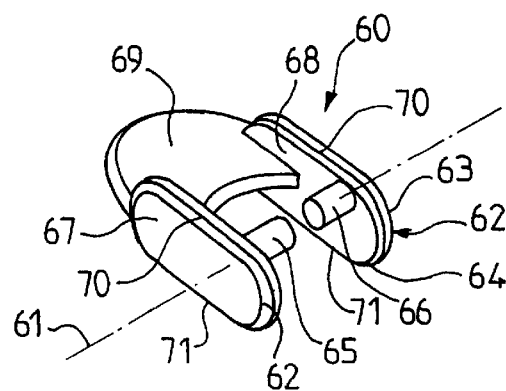

Each bearing surface 62 is extended, at one side and the other of bearing zones 63 and 64, on the one hand by a first rest zone 70 and on other hand by a second rest zone 71. As shown in FIG. 3, rest zones 70 and 71 are formed by two preferably opposed faces of the periphery of each of side pieces 67 and 68. On each of the side pieces, the first rest zone 70 is connected to the second rest zone 71 by a circular sector on which bearing zones 63 and 64 are arranged.

The pivot axis, or articulation, between shank 52 and lever 60 is formed by the two tenons, or pins, 65 and 66 concentric with axis 61 and engaging in cavities 54 and 53, respectively. Each of cavities 54 and 53 has a lateral cutout 55 or 56 permitting insertion of tenons 65 and 66, possibly with a force fit.

Figure 4:
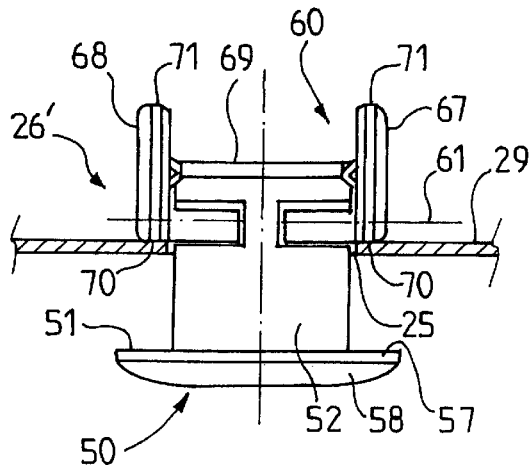
FIGS. 4 and 5 are front elevational views of the second example showing, respectively, the open position and the closed position.
Figure 6:
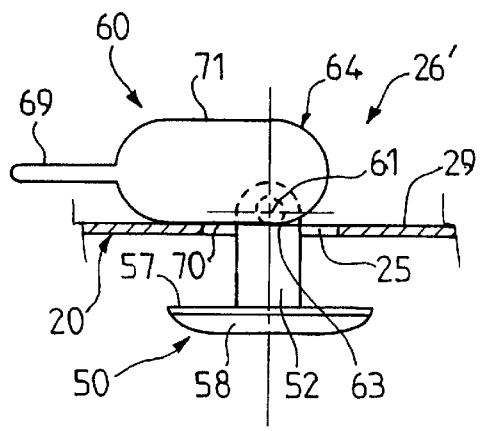
FIGS. 6 and 7 are side elevational views of the second example showing, respectively, the open position and the closed position.

As shown in FIGS. 4 and 6, when first rest zone 70 is in contact with the inner face 29 of receptacle 20, bearing zone 63 is situated in proximity to face 29. Bearing zone 63 being relatively close to axis 61, shank 52 articulated in axis 61 is in a lower position with respect to pouring means 25. Blocking surface 51 is spaced from the opposite, or outer bottom, surface of receptacle 20 and opens pouring means 25. Lever 60 then occupies the position that is desired during slow cooking, or simmering. The recycling of condensates enhances the capability to perform a cooking operation unattended.

Figure 5:
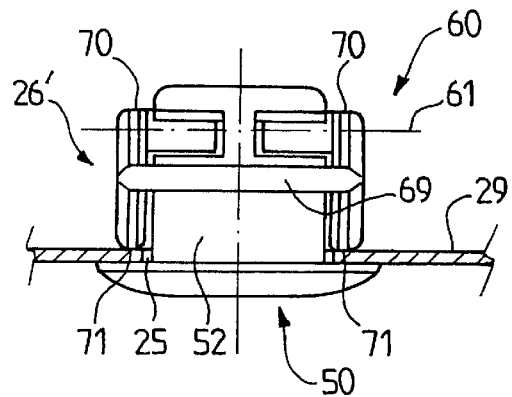
Figure 7:
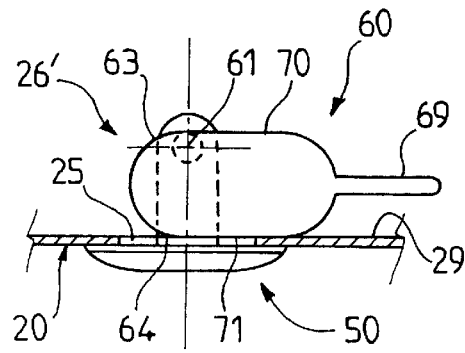

As shown in FIGS. 5 and 7, when second rest zone 71 is in contact with inner face 29 of receptacle 20, bearing zone 64 is situated in proximity to inner face 29. Bearing zone 64 being relatively distant from axis 61, shank 52 is brought into its upper position with respect to pouring means 25. Blocking surface 51 is maintained against the opposite surface, or outer bottom surface, of receptacle 20. Pouring means 25 is thus blocked. Lever 60 then occupies the position desired during steam cooking, allowing cooking juices to be collected in receptacle 20.

The present invention thus provides a versatile steam cooker that is easy to use, allowing several types of steam cooking to be performed.

In order to pass from one position to the other of valve 50, the user simply maneuvers lever 60 by acting on tongue 69. Supporting contact between lever 60 and receptacle 20 is transferred from rest zone 70 to rest zone 71 while passing through bearing zones 63 and 64, and vice versa.

According to one alternative feature of the first embodiment, plug 27 can be made of rigid material, and a joint, or seal, can then be provided on plug 27 or in receptacle 20. Attachment piece 28 is not essential.

According to one alternative form of construction for the second exemplary embodiment, lever 60 can be mounted on the lower surface, or outer bottom surface, of receptacle 20. A spring would then be used to push shank 52 back in order to open pouring means 25. Tenons 65 and 66 can be mounted on shank 52 and cavities 53 and 54 can then be provided in lever 60. Joint 57 can be disposed around orifice 25.

According to a further alternative, pouring means 25 is not necessarily formed in the bottom of receptacle 20, but can alternatively be formed in a lateral wall of receptacle 20, adjacent its bottom.

According to yet another alternative, cooking receptacle 40 can be associated with a lid that is independent of the lid of cooking enclosure 10, or need not have a lid.

This application relates to subject matter disclosed in French Application Number 01 14345, filed Nov. 6, 2001, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A steam cooker comprising:
    a water reservoir for water that is to be converted into steam by a steam generator;
    a cooking enclosure for receiving at least one of a cooking vessel and a support provided with flow passages, said cooking enclosure being arranged to be supplied with steam from the steam generator;
    an intermediate collecting receptacle associated with said cooking enclosure and disposed for collecting liquid that appears in said cooking enclosure during a cooking operation, said intermediate collecting receptacle having a bottom wall provided with pouring means via which liquid can flow from said intermediate collecting receptacle into said water reservoir; and
    a removable closing means associated with said pouring means for selectively blocking flow of liquid via said pouring means, wherein said pouring means are constituted by an orifice in said bottom wall, and said pouring means are configured to allow complete emptying of said intermediate collecting receptacle when said removable closing means are removed from said pouring means.

2. The steam cooker of claim 1, wherein said closing means is fixed to said intermediate collecting receptacle.

3. A steam cooker comprising:
    a water reservoir for water that is to be converted into steam by a steam generator;
    a cooking enclosure for receiving at least one of a cooking vessel and a support provided with flow passages, said cooking enclosure being arranged to be supplied with steam from the steam generator;
    an intermediate collecting receptacle associated with said cooking enclosure and disposed for collecting liquid that appears in said cooking enclosure during a cooking operation, said intermediate collecting receptacle having pouring means via which liquid can flow from said intermediate collecting receptacle into said water reservoir; and a removable closing means associated with said pouring means for selectively blocking flow of liquid via said pouring means, wherein said closing means comprises: a valve having a closing surface and a shank engaged in said pouring means; and a lever to which said shank is coupled for pivotal movement with respect to an off-center pivot axis, said lever having a curved bearing surface that includes first and second zones at respectively different distances from said pivot axis, and said bearing surface engaging a support surface and being movable relative to the support surface such that when said first zone is in contact with the support surface, said closing surface is positioned to open said pouring means to allow liquid to flow from said intermediate collecting receptacle to said water reservoir, and when said second zone is in contact with the support surface, said closing surface is positioned to close said pouring means to block flow of liquid from said intermediate collecting receptacle to said water reservoir.

4. The steam cooker of claim 3, wherein said pouring means is an orifice arranged in a wall of said intermediate collecting receptacle, said closing surface is a ring, and said shank extends from the interior of said ring.

5. The steam cooker of claim 4, wherein said pivot axis is form by two aligned tenons, engaged axially in two cavities each having a lateral cutout permitting a force-fitted insertion of said tenons.

6. The steam cooker of claim 5, wherein said lever has a pair of side pieces, each carrying one of said tenons on an interior face, and said bearing surface comprises two bearing surfaces each arranged on the periphery of a respective side piece.

7. The steam cooker of claim 6, wherein said lever further comprises a tongue connecting said side pieces together.

8. The steam cooker of claim 3, wherein said support surface forms a part of an interior surface of said intermediate collecting receptacle.

9. The steam cooker of claim 3, further comprising a flange fixed to said shank and wherein said closing surface comprises a seal mounted on said flange.

10. The steam cooker of claim 3, wherein said pivot axis is form by two aligned tenons, engaged axially in two cavities each having a lateral cutout permitting a force-fitted insertion of said tenons.

11. The steam cooker of claim 10, wherein said lever has a pair of side pieces, each carrying one of said tenons on an interior face, and said bearing surface comprises two bearing surfaces each arranged on the periphery of a respective side piece.

12. The steam cooker of claim 11, wherein said lever further comprises a tongue connecting said side pieces together.

13. The steam cooker of claim 12, wherein said support surface forms a part of an interior surface of said intermediate collecting receptacle.

14. The steam cooker of claim 13, further comprising a flange fixed to said shank and wherein said closing surface comprises a seal mounted on said flange.

15. The steam cooker of claim 1, wherein said closing means is constituted by a supple plug.

* * * * *